US008966487B1

(12) United States Patent
Leonard (10) Patent No.: US 8,966,487 B1
(45) Date of Patent: Feb. 24, 2015

(54) APPLICATION TRANSACTION WAIT TIME DYNAMIC ADJUSTMENT (71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 240 days.

(21) Appl. No.: 13/653,055

(22) Filed: Oct. 16, 2012

(51) Int. Cl.
*G06F 9/46* (2006.01)
(52) U.S. Cl.
USPC .......................................................... 718/101
(58) Field of Classification Search
CPC ............................... G06F 9/466; H04L 1/1887
See application file for complete search history.

(56) References Cited

U.S. PATENT DOCUMENTS

| 8,468,196 | B1* | 6/2013 | Roskind et al. | 709/203 |
| 2008/0062863 | A1* | 3/2008 | Ginde | 370/221 |
| 2013/0286835 | A1* | 10/2013 | Plamondon et al. | 370/235 |
| 2013/0311622 | A1* | 11/2013 | Das Gupta et al. | 709/221 |
| 2014/0045534 | A1* | 2/2014 | Mahaffey et al. | 455/456.3 |

OTHER PUBLICATIONS

Bea Systems and Sun Microsystems, Class Timeout, 2006, 4 pages.*
Tost, Planning and handling timeouts in service-orietned environments, IBM, Sep. 2009, 11 pages.*

* cited by examiner

Primary Examiner — Diem Cao (57) ABSTRACT

A transaction server. The transaction server comprises a processor, a non-transitory memory, and an application stored in the non-transitory memory. When executed by the processor, the application transmits a plurality of transaction requests to at least one backend server, where the backend server performs processing on the transaction, determines that a transaction request timeout occurs when a transaction response has not been received from the at least one backend server within a timeout time period after transmitting the associated transaction request, and adjusts the timeout time period based on the transaction request timeouts without restarting.

17 Claims, 4 Drawing Sheets

APPLICATION TRANSACTION WAIT TIME DYNAMIC ADJUSTMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Servers may send transactions to backend systems for processing by other servers and/or computers. Transactions may be independent processing tasks or assignments or functions. One or more instances of an application may execute on a single server. A plurality of instances of the application may execute on a plurality of servers. In some circumstances, two different applications may execute on a single server.

SUMMARY

In an embodiment, a transaction server is disclosed. The transaction server comprises a processor, a non-transitory memory, and an application stored in the non-transitory memory. When executed by the processor, the application transmits a plurality of transaction requests to at least one backend server, where the backend server performs processing on the transaction, determines that a transaction request timeout occurs when a transaction response has not been received from the at least one backend server within a timeout time period after transmitting the associated transaction request, where the timeout time period is stored in the non-transitory memory, and adjusts the timeout time period based on the transaction request timeouts without restarting.

In an embodiment, a method of managing transactions by an application executing on a computer system is disclosed. The method comprises automatically determining a transaction timeout state of the application based on a number of transaction requests that are timed out by the application, where a transaction request is timed out by the application when a transaction request response is not received before a period of time defined by a timeout parameter and adjusting the timeout parameter to a shorter time when the transaction timeout state corresponds to an excess number of transaction requests that are timed out.

In an embodiment, a method of managing transactions by an application executing on a computer system is disclosed. The method comprises automatically determining a transaction timeout state of the application based on a number of transaction requests that are timed out by the application, where a transaction request is timed out by the application when a transaction request response is not received before a period of time defined by a timeout parameter and adjusting the timeout parameter to a longer time when the transaction timeout state corresponds to the number of transaction requests that are timed out being less than a predefined threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A transaction processing system that promotes adjusting a transaction wait time and/or timeout parameter without restarting a transaction application is taught herein. Transaction requests may be sent by a transaction application to a backend server to process, for example to be processed by a backend process executing on the backend server. If the transaction response is not received within a timeout interval or a wait time interval, the transaction application may declare the subject transaction request timed out and take remedial action of various kinds. This may be referred to as a transaction request timeout or a transaction timeout. Typical transaction processing systems have a timeout parameter that is statically defined. If this timeout parameter is changed, the transaction application that relies on the timeout parameter may need to be restarted to take account of the new timeout parameter value.

Transaction processing loads can be variable, for example the number of transaction requests received during a time interval by a backend server may vary. If the backend server cannot keep up with the transaction request load, the transaction requests may stagnate in waiting queues, and transaction timeouts may increase at the transaction applications. To avoid excessive numbers of timeouts occurring while processing transactions, the transaction servers may be over provisioned or over engineered to handle nearly the worst case processing load. An over provisioned server farm may lead to an enterprise purchasing more servers than necessary for normal processing, and much of the power of the over provisioned server farm may idle away until the rare heavy processing load causes them to be recruited and fully loaded. This over provisioned or over engineering entails excess costs and inefficiency. Over provisioning of servers may occur when adding memory to carry more threads that are waiting on transaction requests to be processed and to receive the corresponding transaction responses. When the memory board capacity of a server is exceeded, an additional server may be purchased to contain the additional memory boards. Servers are expensive.

A monitoring functionality is disclosed that determines a current transaction timeout state. Based on this transaction timeout state, a transaction timeout parameter of an application may be adjusted and put into service without restarting the subject application. The timeout parameter may be adjusted manually, for example by an administrator revising a memory value, or automatically, for example by the monitoring functionality or the transaction application adjusting the transaction timeout parameter.

In an embodiment, when the current transaction timeout state corresponds to an excessive number of transaction request timeouts or an excessively high percentage of transaction requests that timeout, the transaction timeout parameter may be reduced. This counterintuitive adjustment may result in transaction requests timing out more frequently. Without wishing to be bound by theory, this adjustment is thought to lead to transaction requests timing out that were likely to timeout in any case. By timing out the transaction requests more quickly, however, the queuing up of additional transaction requests to be processed and/or the spawning of processing threads to handle the transaction requests is reduced. By timing out more promptly transaction requests that are doomed to time out in any case, in view of the heavy transaction load, the increase of processing threads may be avoided and the impulse to over provision or over engineer transaction servers may likewise be avoided. In an embodiment, when the current transaction timeout state corresponds to a deficient number of transaction request timeouts, the transaction timeout parameter may be increased.

Figure 1:
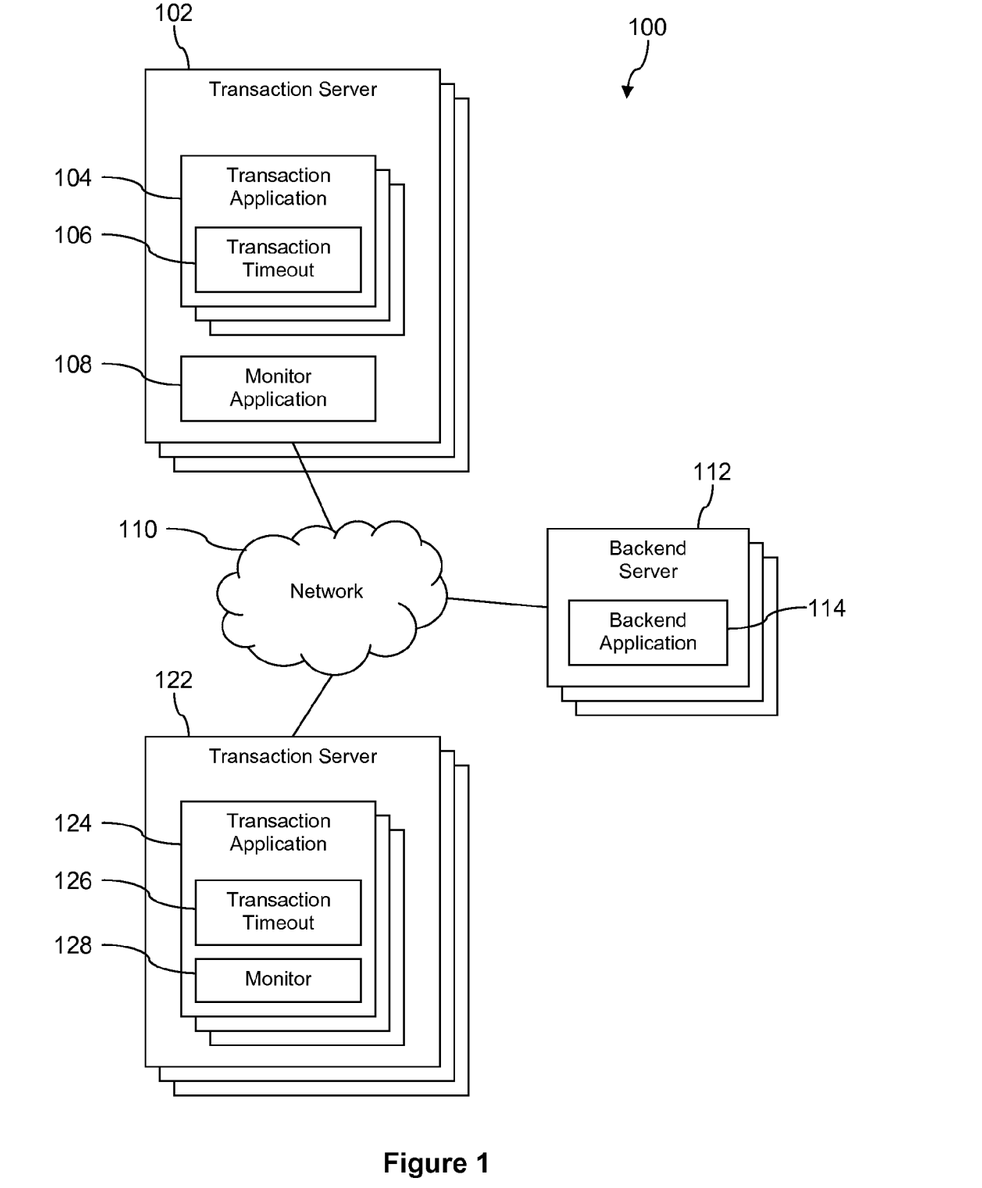
FIG. 1 is an illustration of a transaction processing system according to an embodiment of the disclosure.

Turning now to FIG. 1, a transaction processing system 100 is described. In an embodiment, the system 100 comprises one or more transaction servers 102, 122. The transaction servers 102, 122 may be computers or computer systems. Computer systems are described in more detail hereinafter. In some contexts, the transaction servers 102, 122 may be referred to as an application server. The transaction server 102 may comprise one or more transaction applications 104 or application instances. An application may refer to the compiled code or image of a computer program, and an instance of an application may be the loaded and executing application, for example executable instructions loaded in memory, data loaded in memory, and heap memory. Under some circumstances, multiple instances of the same application may be launched and executed on a computer at one time. For example, the computer may have multiple hardware processors each of which execute a separate instance of an application. Alternatively, the computer may have multiple virtual processors each of which execute a separate instance of an application. The description below will not generally distinguish between applications and application instances and will refer to both of these concepts with the single term application when no confusion seems likely to result. If confusion is possible, the distinction will be applied. The transaction application 104 may comprise a transaction timeout parameter 106. In some contexts, the transaction timeout parameter 106 may be referred to as a transaction wait time. The transaction servers 102 may further comprise at least one monitor application 108. The transaction application 104 and the monitor application 108 may be stored in a non-transitory memory of the transaction server 102 and may be executed by a processor of the transaction server 102. In an embodiment, one monitor application 108 may be associated with or monitor a plurality of transaction applications 104.

The transaction servers 122 may comprise one or more transaction applications 124 or application instances. The transaction application 124 may comprise a transaction timeout parameter 126 and a monitor component 128. The transaction application 124 may be stored in a non-transitory memory of the transaction server 122 and may be executed by a processor of the transaction server 122.

The main difference between the configuration of the transaction server 102 and the configuration of the transaction server 122 is the implementation of the monitoring functionality. In the transaction server 102, the monitoring functionality is provided by the separate monitor application 108. In the transaction server 122, the monitoring functionality is provided by the monitor component 128 which is incorporated into the transaction application 124. One skilled in the art will appreciate that each of these two configurations may have advantages in some environments and solution spaces and disadvantages in other environments or solution spaces. One skilled in the art will readily be able to select the configuration that is most suitable for his or her specific solution. The discussion below will focus on the configuration of the transaction server 102, but, unless discussed separately, it is understood that this discussion may apply equally to the configuration of the transaction server 122.

The transaction application 104 may perform any of a variety of functions in a business enterprise or other computing environment. To deliver its intended functionality, the transaction application 104 transmits a transaction request via the network 110 to the backend server 112 to be processed by a backend application 114 or backend application instance that executes on the backend server 112. The backend application 114 may perform the requested transaction processing and return a transaction result to the transaction application 104. The network 110 may comprise one or more public networks, one or more private networks, or a combination thereof.

In an embodiment, the transaction application 104 may transmit the transaction request to a messaging platform (not shown), such as a message queue manager server, and the messaging platform may transmit the transaction request on to the backend application 114. Likewise, in this embodiment, the backend application 114 may send the transaction result to the messaging platform, and the messaging platform may send the transaction result on to the transaction application 104. The use of a messaging platform as briefly sketched above may promote decoupling the transaction application 104 and/or the transaction server 102 from the backend application 114 and/or the backend server 112. The messaging platform may queue received messages and deliver them when the addressed application 104, 114 is ready to receive the subject message. In some contexts the messaging platform may be said to provide a messaging layer or a message transport layer. In some contexts, the messaging platform may be referred to as messaging middleware.

The transaction application 104 may determine or trigger a transaction timeout event if a transaction reply is not received within the predefined period of time stored in the transaction timeout parameter 106. For example, if the timeout parameter stores a value of 5 seconds, if the transaction reply is not received by the transaction application 104 within 5 seconds of sending the transaction request, the transaction application 104 decides or determines that a timeout has occurred or triggers a timeout event. In case of such a timeout, the transaction application may take remedial action such as raising an exception, posting an error message, retransmitting the transaction request, or some other action. In some contexts the predefined period of time stored in the transaction timeout parameter 106 may be referred to as a timeout time period. In some contexts, the transaction timeout parameter 106 may be referred to as a timeout time period.

In an embodiment, the transaction timeout parameter 106 may be adapted or changed during the course of execution of the transaction application 104 without restarting the application 104. The transaction timeout parameter 106 may be changed in a variety of ways. In an embodiment, an administrator may change the transaction timeout parameter 106. Alternatively, the transaction timeout parameter 106 may be changed or adapted automatically by the transaction application 104 and/or by the monitor application 108. Likewise, the transaction timeout parameter 126 may be adapted or changed during the course of execution of the transaction application 124 without restarting the application 124. In an embodiment, an administrator may change the transaction timeout parameter 126. Alternatively, the transaction timeout parameter 126 may be adapted or changed by the transaction application 124 and/or by the monitor 128.

The monitor application 108 may monitor the transaction requests transmitted by the transaction application 104, for example to determine a number of timeouts that occur in transactions requested by the transaction application 104. The transaction application 104 may send a message to the monitor application 108 when a timeout event occurs. The monitor 128 may monitor the transaction requests transmitted by the transaction application 124 to determine a number of timeouts that occur in transactions requested by the transaction application 124. The monitor application 108, and the monitor 128 may determine a rate of timeouts or a percentage of timeouts based on all transaction requests. Either the rate of timeouts or the percentage of timeouts may be referred to as a timeout burden.

The rate of timeouts and/or the percentage of timeouts may be determined over a period of time, for example over an about one minute time period, over an about five minute time period, over an about fifteen minute time period, over an about one hour time period, or some other time period. In an embodiment, when the transaction processing system 100 is operating normally, the percentage of timeouts may be in the range from about 1% of transactions to about 5% of transactions. Alternatively, the rate of timeouts and/or the percentage of timeouts may be determined over a predefined number of transaction requests, for example over about 1000 transaction requests.

Figure 2A:
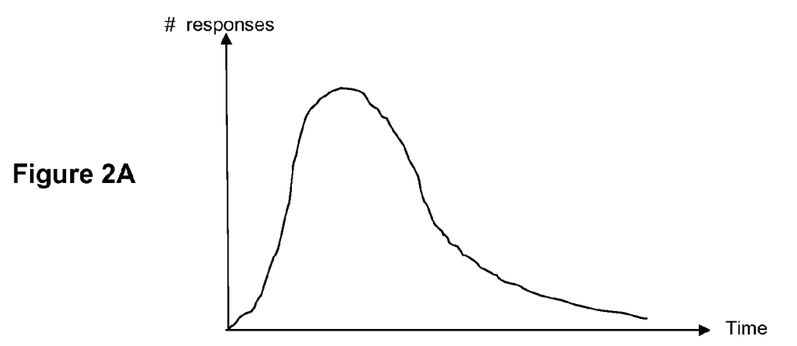
FIG. 2A, FIG. 2B, and FIG. 2C are graphs illustrating different transaction response time distributions according to an embodiment of the disclosure.
Figure 2B:
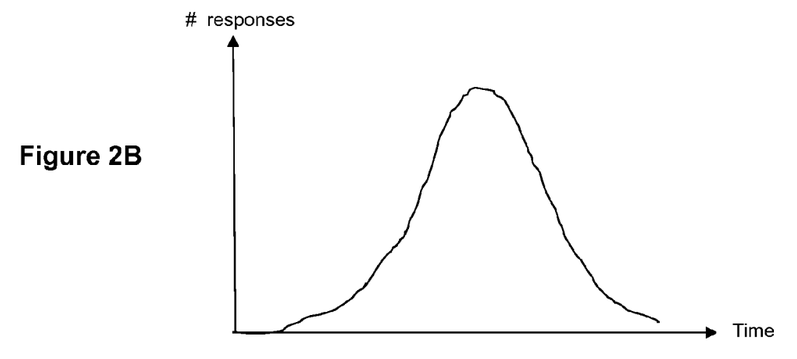
Figure 2C:
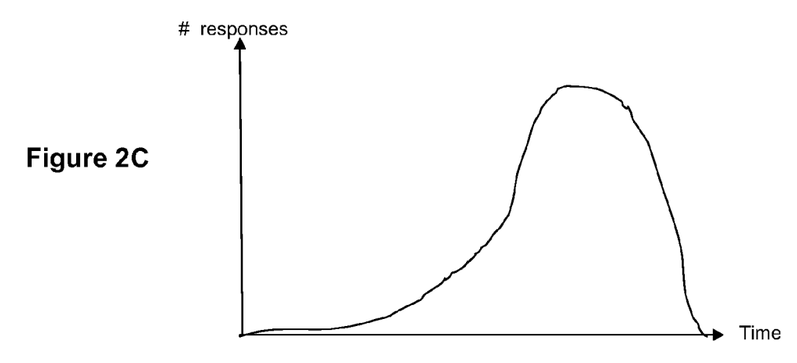

Turning now to FIG. 2A, FIG. 2B, and FIG. 2C, three different transaction response time graphs are described. In each of the graphs the horizontal axis represents time, and increasing time is associated with moving further to the right along the horizontal axis. The vertical axis represents the number of transaction responses that complete in the associated time, and moving up along the vertical axis is associated with greater numbers of transaction responses. The graphs may represent the distribution of transaction response times experienced by the transaction application 104, 124 under during different loading conditions. A distribution of transaction response times can be expected because different types of transactions consume different amounts of time to complete. Further, during periods of heavy transaction processing loads, the transaction response times may be expected to increase due to queuing or waiting of transactions prior to handling by the backend application 114.

In FIG. 2A, while there is a distribution of response times—a small number of response times are very short, a large number of response times are short, some response times are medium length, and a small number of response times are long—most of the responses are relatively speaking short time length. The transaction response time distribution of FIG. 2A may correspond to a low transaction processing load on the system 100. The transaction response time of FIG. 2A may be dominated by the inherent processing time of each different transaction type.

In FIG. 2B, most of the response times are relatively medium time length. The transaction response time distribution of FIG. 2B may correspond to a medium transaction processing load on the system 100. The transaction response time of FIG. 2B may be due to about equally the inherent processing time of each different transaction type and some queuing delay before being processed.

In FIG. 2C, most of the response times are relatively long time length. The transaction response time distribution of FIG. 2C may correspond to a heavy transaction processing load on the system 100. The transaction response time of FIG. 2C may be dominated by queuing delays.

In a transaction application 104, 124 having a statically configured transaction timeout parameter 106, 126, when the system 100 is heavily loaded, a high percentage of the transaction requests are likely to timeout. In an embodiment, when the monitor application 108 or the monitor component 128 determines that a high timeout burden exists, the transaction timeout parameter 106, 126 may be adapted by making it shorter. The sense of this adaptation may be thought to be counterintuitive. If timeouts are occurring and timeouts are "bad" or undesirable naturally the timeout period should be increased to prevent or reduce timeouts, right? Increasing the timeout period may reduce the number of timeouts under some circumstances. At the same time increasing the timeout period under the conditions associated with the response time graph of FIG. 2C may lead to a significant increase in the number of transaction threads, an increase in memory consumption, and an increase in processing overhead. This may lead to overprovisioning the transaction servers 102, 122, for example installing excessive memory. Since servers are often limited on the number of memory boards that can be installed, this may result in an excessive number of expensive server computers being purchased. It is to be noted that the overprovisioning solution addresses the excessive load condition: when the system 100 is lightly loaded, the overprovisioning provides no particular benefit.

By shortening the timeout interval during a high timeout burden condition, transaction requests that are likely to timeout anyway timeout more quickly and without spawning additional transaction processing threads and loading up the memory resources of the transaction servers 102, 122. The transaction timeout parameter 106, 126 may be reduced when the percentage of transaction requests that timeout exceeds about 5% of transaction requests. In an embodiment, when the percentage of transaction requests that timeout is less than about 1% of transaction requests, the transaction timeout parameter 106, 126 may be increased. In an embodiment, the transaction timeout parameter 106, 126 may be constrained to the range of values from about 500 mS to about 20 S. Alternatively in an embodiment, the transaction timeout parameter 106, 126 may be constrained to the range of values from about 1 S to about 5 S. In another embodiment, however, the transaction timeout parameters 106, 126 may be constrained to a different range of values.

Figure 3:
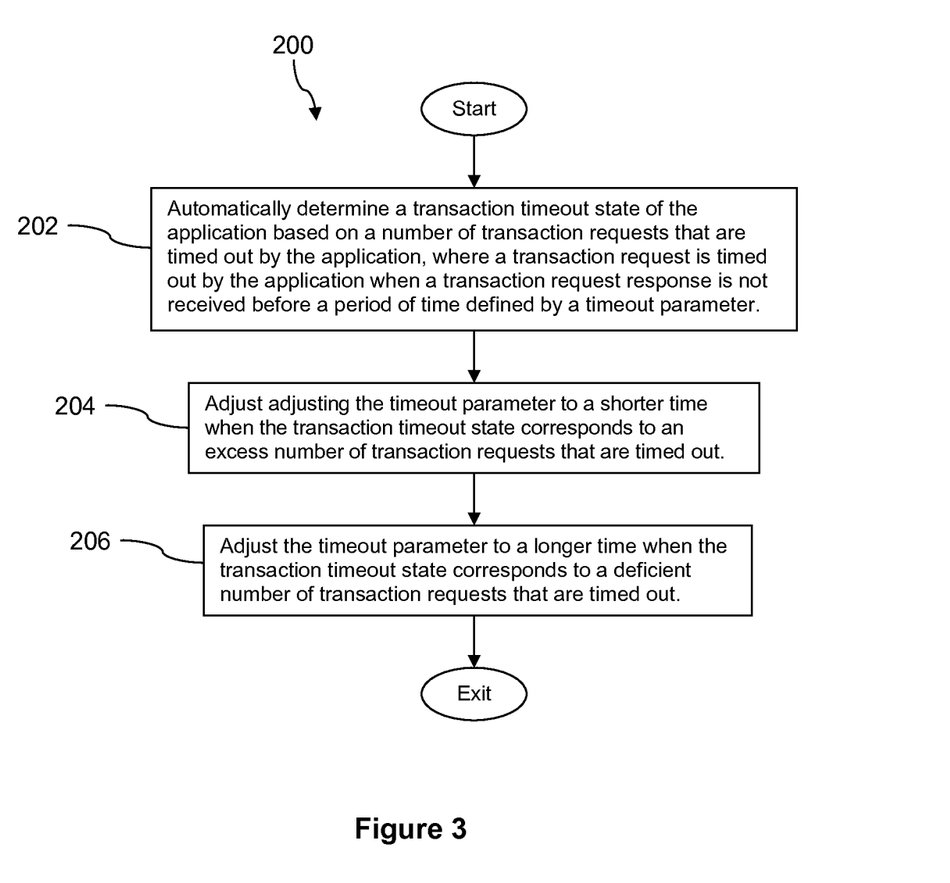
FIG. 3 is a flow chart of a method according to an embodiment of the disclosure.

Turning now to FIG. 3, a method 200 for managing transactions by an application executing on a computer system is described. At block 202, a transaction timeout state of the application is automatically determined based on a number of transaction requests that are timed out by the application, where a transaction request is timed out by the application when a transaction request response is not received before a period of time defined by a timeout parameter. For example, the monitor application 108 or the monitor component 128 may determine that an excessive number of transaction requests transmitted by the transaction application 104, 124 have timed out during a time interval. Alternatively, the monitor application 108 or the monitor component 128 determines that an excessive percentage of transaction requests transmitted by the transaction application 104, 124 have timed out. For example, the monitor application 108 or the monitor component 128 may determine that more than 5% of transaction requests transmitted by the transaction application 104, 124 have timed out during the most recent monitoring interval, for example over the last five minutes or over some other time interval. The monitor application 108 or the monitor component 128 likewise may determine that less than a threshold percentage of transaction requests transmitted by the transaction application 104, 124 have timed out. The transaction timeout state may have a low state, a normal state, or a high state.

At block 204, the timeout parameter may be adjusted to a shorter time when the transaction timeout state corresponds to an excess number of transaction requests that are timed out. This may be referred to as a high transaction timeout state. At block 206, the timeout parameter may be adjusted to a longer time when the transaction timeout state corresponds to the number of transaction requests that are timed out being deficient or less than a predefined threshold. This may be referred to as a low transaction timeout state. The timeout parameter may be adjusted within range constraints or range limits, for example to the range from about 500 mS to about 20 S. Alternatively, the timeout parameter may be adjusted within a range of from about 1 S to about 5 S. If the transaction timeout state determined in block 202 is normal, the timeout parameter may not be adjusted but left unchanged.

Figure 4:
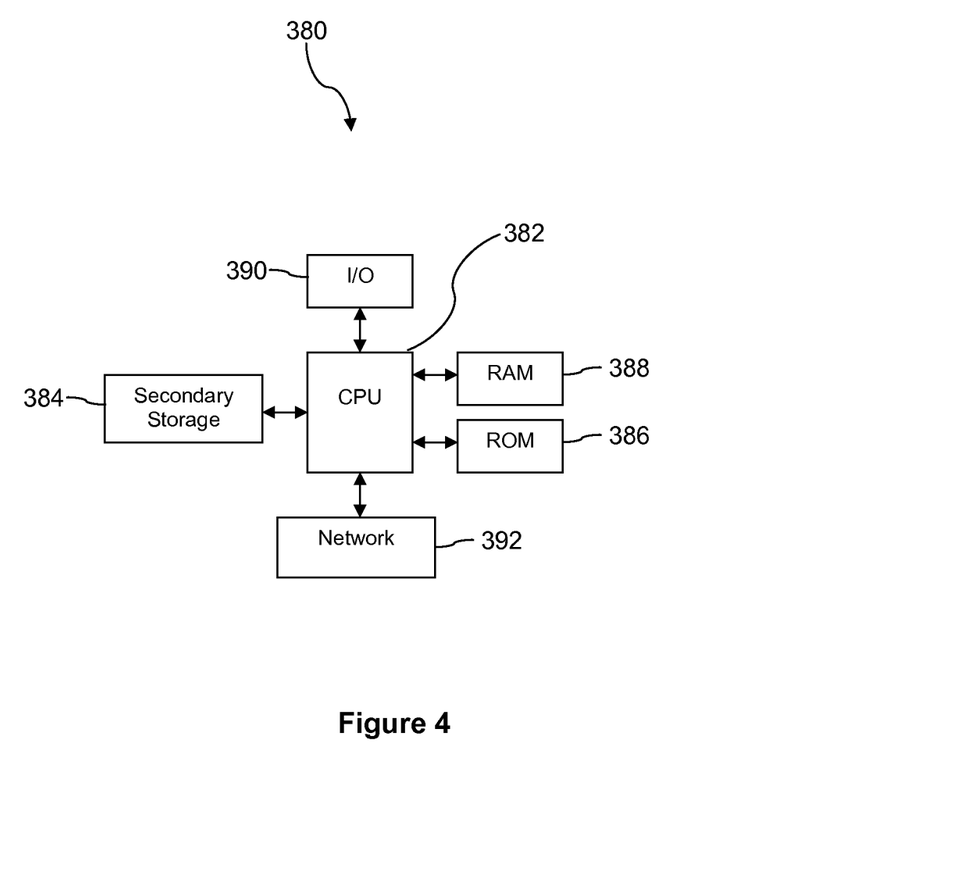
FIG. 4 is a block diagram of a computer system according to an embodiment of the disclosure.

FIG. 4 illustrates a computer system 380 suitable for implementing one or more embodiments disclosed herein. The computer system 380 may be used to implement the servers 102, 112, 122 described above with reference to FIG. 1. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A transaction server, comprising:
a processor;
a non-transitory memory; and
an application stored in the non-transitory memory that, when executed by the processor,
transmits a plurality of transaction requests to at least one backend server, where the backend server performs processing on the transaction,
determines that a transaction request timeout occurs when a transaction response has not been received from the at least one backend server within a timeout time period after transmitting the associated transaction request, where the timeout time period is stored in the non-transitory memory,
determines a transaction timeout state of the application based on a number of transaction requests that are timed out by the application,
compares the transaction timeout state to a predefined threshold, and
without restarting the application and in response to a determination that the transaction timeout state exceeds the predefined threshold, adjusts the timeout time period to a shorter time.

2. The transaction server of claim 1, wherein the plurality of transaction requests are sent to the backend server via a messaging platform.

3. The transaction server of claim 1, wherein the application adjusts the timeout period when more than about 5% of transaction requests result in a timeout.

4. The transaction server of claim 3, wherein when more than about 5% of transaction requests result in a timeout, the application reduces the timeout period.

5. The transaction server of claim 1, wherein the application adjusts the timeout period when less than about 1% of transaction requests result in a timeout.

6. The transaction server of claim 5, wherein when less than about 1% of transaction requests result in a timeout, the application increases the timeout period.

7. A method of managing transactions by an application executing on a computer system, comprising:
automatically determining, by a transaction application, a transaction timeout state of the transaction application based on a number of transaction requests that are timed out by the transaction application, where a transaction request is timed out by the transaction application when a transaction request response is not received before a period of time defined by a timeout parameter;
comparing, by the transaction application, the transaction timeout state to a predefined threshold; and
in response to a determination that the transaction timeout state exceeds the predefined threshold, automatically adjusting, by the transaction application, the timeout parameter to a shorter time, wherein the adjusting is performed without restarting the transaction application.

8. The method of claim 7, wherein the timeout parameter is constrained to a value between 500 mS and 20 S.

9. The method of claim 7, wherein the transaction timeout state is one of normal, low, and high.

10. The method of claim 9, wherein the transaction timeout state is determined to be high when the number of timed out transaction requests exceed about 5% of transaction requests.

11. The method of claim 9, wherein the transaction timeout state is determined to be low when the number of timed out transaction requests are less than about 1% of transaction requests.

12. The method of claim 11, further comprising adjusting, by the transaction application, the timeout parameter to a longer time when the transaction timeout state is determined to be low.

13. A method of managing transactions by an application executing on a computer system, comprising:
automatically determining, by a monitoring application, a transaction timeout state of a transaction application based on a number of transaction requests that are timed out by the transaction application, where a transaction request is timed out by the transaction application when a transaction request response is not received before a period of time defined by a timeout parameter;
comparing, by the monitoring application, the transaction timeout state to one or more predefined thresholds;
in response to a determination that the transaction timeout state is greater than a first of the one or more predefined thresholds, adjusting, by the monitoring application, the timeout parameter to a shorter time; and
in response to a determination that the transaction timeout state is less than a second of the one or more predefined thresholds, adjusting, by the monitoring application, the timeout parameter to a longer time.

14. The method of claim 13, wherein automatically determining the transaction timeout state of the transaction application is based on a percent of transaction requests that are timed out during a most recently completed predefined block of time.

15. The method of claim 13, wherein automatically determining the transaction timeout state of the transaction application is based on a percent of transaction requests that are timed out during a most recently completed predefined time duration.

16. The method of claim 13, wherein automatically determining the transaction timeout state of the transaction application is based on a percent of transaction requests that are timed out for the most recently completed predefined number of transaction requests.

17. The method of claim 13, wherein the monitoring application receives backend state information about transaction request processing from a backend server, and wherein the monitoring application adjusts the transaction timeout state further based on the backend state information.

* * * * *